US012767118B2

(12) United States Patent
Takahashi et al.

(10) Patent No.: US 12,767,118 B2
(45) Date of Patent: Oct. 20, 2026

(54) HYBRID ELECTRIC VEHICLE, CONTROL METHOD FOR HYBRID ELECTRIC VEHICLE, POWER SUPPLY MODE SETTING SYSTEM, AND POWER SUPPLY MODE SETTING METHOD

(71) Applicant: TOYOTA JIDOSHA KABUSHIKI KAISHA, Toyota (JP)

(72) Inventors: Yoshimitsu Takahashi, Toyota (JP); Takahiro Ariie, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 19/002,317

(22) Filed: Dec. 26, 2024

(65) Prior Publication Data

US 2025/0214565 A1 Jul. 3, 2025

(30) Foreign Application Priority Data

Dec. 29, 2023 (JP) ................................ 2023-223763

(51) Int. Cl.
*B60W 20/17* (2016.01)
*B60W 10/06* (2006.01)
*B60W 10/30* (2006.01)
*B60W 50/14* (2020.01)

(52) U.S. Cl.
CPC ............ *B60W 20/17* (2016.01); *B60W 10/06* (2013.01); *B60W 10/30* (2013.01); *B60W 50/14* (2013.01)

(58) Field of Classification Search
CPC ...... B60W 50/14; B60W 10/30; B60W 10/06; B60W 20/17
USPC ........................................................... 701/22
See application file for complete search history.

(56) References Cited

U.S. PATENT DOCUMENTS

| | | | | |
|---|---|---|---|---|
| 10,875,421 B2 | 12/2020 | Ichikawa | | |
| 2013/0066499 A1* | 3/2013 | Niste | B60W 20/50 | 180/65.265 |
| 2013/0244828 A1* | 9/2013 | Kayano | B60W 10/08 | 477/7 |
| 2015/0069034 A1* | 3/2015 | Burkhart | B23K 9/1006 | 219/133 |
| 2015/0298688 A1* | 10/2015 | Teraya | B60L 58/40 | 180/65.265 |
| 2015/0314685 A1* | 11/2015 | Imamura | B60L 50/61 | 318/504 |

(Continued)

FOREIGN PATENT DOCUMENTS

| | | |
|---|---|---|
| EP | 3321121 B1 | 7/2021 |
| JP | 2014-121968 A | 7/2014 |

(Continued)

*Primary Examiner* — Yazan A Soofi
(74) *Attorney, Agent, or Firm* — Dinsmore & Shohl LLP

(57) ABSTRACT

A hybrid electric vehicle includes engine configured to output power using fuel from a fuel tank, a generator configured to generate power using a power from the engine, a power storage device connected to a power line together with the generator; and a controller. When a user desires external power supply, in which power is supplied from the vehicle to outside of the vehicle, the controller presents the user with multiple power supply modes that have different power supply characteristics, and when the user selects one of the multiple power supply modes, the controller performs the external power supply in the power supply mode selected by the user.

14 Claims, 9 Drawing Sheets

(56) References Cited

U.S. PATENT DOCUMENTS

| | | | | |
|---|---|---|---|---|
| 2016/0039404 | A1* | 2/2016 | Tanaka | B60W 20/00<br>180/65.265 |
| 2016/0195911 | A1* | 7/2016 | Chapel | G06F 1/28<br>713/340 |
| 2017/0088011 | A1* | 3/2017 | Li | B60K 6/46 |
| 2018/0201249 | A1* | 7/2018 | Belloso | B60W 20/10 |
| 2020/0238849 | A1 | 7/2020 | Kusada et al. | |
| 2020/0398658 | A1* | 12/2020 | Li | B60K 17/344 |
| 2021/0344194 | A1* | 11/2021 | Pachoud | H02J 1/14 |
| 2022/0205796 | A1* | 6/2022 | Wray | G01C 21/3469 |
| 2025/0214565 | A1* | 7/2025 | Takahashi | B60K 6/445 |

FOREIGN PATENT DOCUMENTS

| | | | |
|---|---|---|---|
| JP | 2014-204600 | A | 10/2014 |
| JP | 2019-097334 | A | 6/2019 |
| JP | 2020-117178 | A | 8/2020 |
| JP | 2023-025577 | A | 2/2023 |

* cited by examiner

HYBRID ELECTRIC VEHICLE, CONTROL METHOD FOR HYBRID ELECTRIC VEHICLE, POWER SUPPLY MODE SETTING SYSTEM, AND POWER SUPPLY MODE SETTING METHOD

CROSS-REFERENCE TO RELATED APPLICATION

The present disclosure claims priority to Japanese Patent Application No. 2023-223763 filed on Dec. 29, 2023, which is incorporated herein by reference in its entirety including specification, drawings and claims.

TECHNICAL FIELD

The present disclosure relates to a hybrid electric vehicle, a control method for a hybrid electric vehicle, a power supply mode setting system, and a power supply mode setting method.

BACKGROUND

Conventionally, in a proposed power control system that controls the power exchanged between a vehicle and power equipment, when power is discharged from the vehicle to the power equipment, the power control system sets the power discharged from the vehicle per unit time to a discharge power setting value set by the user (see, for example, Patent Document 1).

CITATION LIST

Patent Literature

PTL 1: JP2019-97334

SUMMARY

In the system described above, when a user desires an external power supply, in which power is supplied from the vehicle to the outside of the vehicle, it may be difficult for the user to understand how to set the discharge power setting value. For this reason, when the user desires the external power supply, it is required that the user be able to set the power supply mode more easily.

The main object of the hybrid electric vehicle, the control method for the hybrid electric vehicle, the power supply mode setting system, and the power supply mode setting method according to the present disclosure are to enable the user to set the power supply mode more easily.

In order to achieve the above main object, the hybrid electric vehicle, the control method for the hybrid electric vehicle, the power supply mode setting system, and the power supply mode setting method according to the present disclosure employs the following configuration.

A hybrid electric vehicle according to the present disclosure is a hybrid electric vehicle comprising: an engine configured to output power using fuel from a fuel tank; a generator configured to generate power using the power from the engine; a power storage device connected to a power line together with the generator; and a controller. When a user desires external power supply, in which power is supplied from the vehicle to outside of the vehicle, the controller is programmed to present the user with multiple power supply modes that have different power supply characteristics, and when the user selects one of the multiple power supply modes, the controller is programmed to perform the external power supply in the power supply mode selected by the user.

In the hybrid electric vehicle according to the present disclosure, when the user desires the external power supply, in which the power is supplied from the vehicle to the outside of the vehicle, the controller presents the user with the multiple power supply modes that have the different power supply characteristics, and when the user selects one of the multiple power supply modes, the controller performs the external power supply in the power supply mode selected by the user. Therefore, as the user only needs to select one of the multiple power supply modes, the user is able to set the power supply mode more easily. Here, the "external power supply" may refer to supplying power from the vehicle to an external device or to supplying power from the vehicle to a house or similar structures. The "external device" is a device that is not components of the vehicle, and an example includes an electrical appliance or a mobile device.

A control method for a hybrid electric vehicle according to the present disclosure is a control method for a hybrid electric vehicle comprising: an engine configured to output power using fuel from a fuel tank; a generator configured to generate power using the power from the engine; and a power storage device connected to a power line together with the generator. When a user desires external power supply, in which power is supplied from the vehicle to outside of the vehicle, the control method is programmed to present the user with multiple power supply modes that have different power supply characteristics, and when the user selects one of the multiple power supply modes, the control method is programmed to perform the external power supply in the power supply mode selected by the user.

In the control method for a hybrid electric vehicle according to the present disclosure, when the user desires the external power supply, in which the power is supplied from the vehicle to the outside of the vehicle, the control method presents the user with the multiple power supply modes that have the different power supply characteristics, and when the user selects one of the multiple power supply modes, the control method performs the external power supply in the power supply mode selected by the user. Therefore, as the user only needs to select one of the multiple power supply modes, the user is able to set the power supply mode more easily.

A power supply mode setting system according to the present disclosure is a power supply mode setting system for a hybrid electric vehicle comprising: an engine configured to output power using fuel from a fuel tank; a generator configured to generate power using the power from the engine; a power storage device connected to a power line together with the generator; and a controller, and the power supply mode setting system being used to set a power supply mode when a user desires external power supply, in which power is supplied from the vehicle to outside of the vehicle. The power supply mode setting system is programmed to present the user with multiple power supply modes that have different power supply characteristics, and when the user selects one of the multiple power supply modes, the power supply mode setting system is programmed to cause the vehicle to perform the external power supply in the power supply mode selected by the user.

In the power supply mode setting system according to the present disclosure, the power supply mode setting system presents the user with multiple power supply modes that have different power supply characteristics, and when the user selects one of the multiple power supply modes, the power supply mode setting system causes the vehicle to perform the external power supply in the power supply mode selected by the user. Therefore, as the user only needs to select one of the multiple power supply modes, the user is able to set the power supply mode more easily. Here, the "power supply mode setting system" may be a controller installed in the hybrid vehicle, or it may be a mobile device capable of communicating with the hybrid vehicle, such as a smartphone or tablet.

A power supply mode setting method is a power supply mode setting method for a hybrid electric vehicle comprising: an engine configured to output power using fuel from a fuel tank; a generator configured to generate power using the power from the engine; a power storage device connected to a power line together with the generator; and a controller, and the power supply mode setting method being used to set a power supply mode when a user desires external power supply, in which power is supplied from the vehicle to outside of the vehicle. The power supply mode setting method is programmed to present the user with multiple power supply modes that have different power supply characteristics, and when the user selects one of the multiple power supply modes, the power supply mode setting method is programmed to cause the vehicle to perform the external power supply in the power supply mode selected by the user.

In the power supply mode setting method according to the present disclosure, the power supply mode setting method presents the user with multiple power supply modes that have different power supply characteristics, and when the user selects one of the multiple power supply modes, the power supply mode setting method causes the vehicle to perform the external power supply in the power supply mode selected by the user. Therefore, as the user only needs to select one of the multiple power supply modes, the user is able to set the power supply mode more easily.

DESCRIPTION OF EMBODIMENTS

Figure 1:
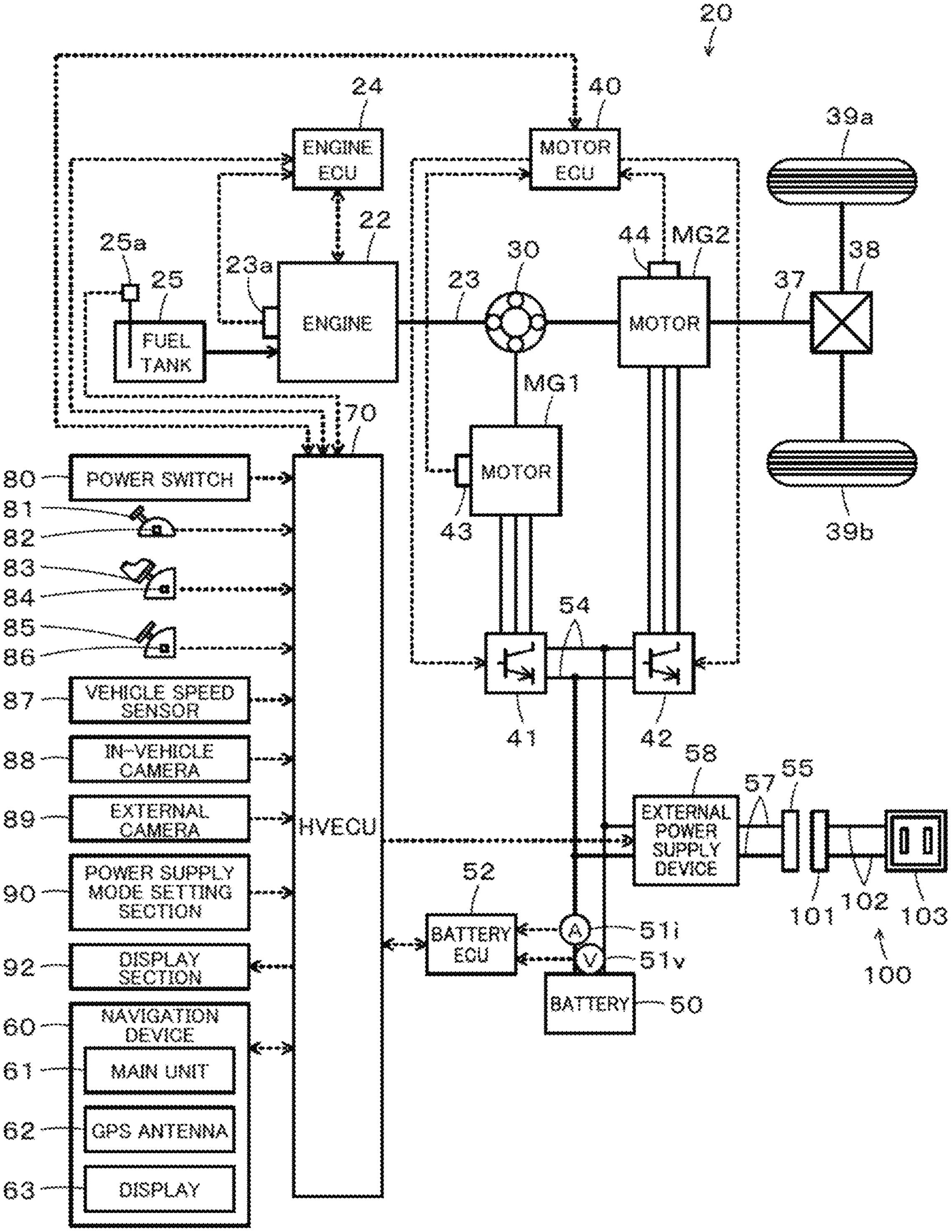
FIG. 1 is a schematic configuration diagram of a hybrid electric vehicle according to an embodiment of the present disclosure.

Embodiments of the present disclosure will be described with reference to the drawings. FIG. 1 is a schematic configuration diagram of a hybrid electric vehicle 20 according to an embodiment of the present disclosure. As shown in FIG. 1, the hybrid electric vehicle 20 according to the embodiment includes an engine 22, a planetary gear 30, motors MG1 and MG2, inverters 41 and 42, a battery 50, a connector 55, an external power supply device 58, a navigation device 60, and a hybrid electronic control unit (hereinafter referred to as "HVECU") 70.

The engine 22 is configured as an internal combustion engine that outputs power using fuel such as gasoline or diesel from a fuel tank 25. The crankshaft 23 of the engine 22 is connected to the carrier of the planetary gear 30. The engine 22 is controlled in operation by an engine electronic control unit (hereinafter referred to as "engine ECU") 24.

The engine ECU 24 includes a microcomputer that has a CPU, ROM, RAM, flash memory, input/output ports, and communication ports. The engine ECU 24 inputs signals from various sensors via the input ports. For example, the engine ECU 24 inputs a crank angle θcr from a crank position sensor 23*a*, which detects a rotational position of the crankshaft 23. The engine ECU 24 outputs various control signals via the output ports. For example, the engine ECU 24 outputs control signals to the intake valves, fuel injectors, and ignition plugs (all of which are not shown). The engine ECU 24 calculates a rotational speed Ne of the engine 22 based on the crank angle θcr of the crankshaft 23. The engine ECU 24 communicates with the HVECU 70.

The planetary gear 30 is configured as a single pinion type planetary gear mechanism. The sun gear of the planetary gear 30 is connected to the rotor of the motor MG1. The ring gear of the planetary gear 30 is connected to a drive shaft 37 that is linked to the drive wheels 39*a* and 39*b* via a differential gear 38. The carrier of the planetary gear 30 is connected to the crankshaft 23 of the engine 22.

The motors MG1 and MG2 are configured, for example, as synchronous motors. The rotor of the motor MG1 is connected to the sun gear of the planetary gear 30, as mentioned above. The rotor of the motor MG2 is connected to the drive shaft 37. The inverters 41 and 42 are configured as inverter circuits that have multiple switching elements, respectively. The inverters 41 and 42 are connected to the battery 50 via a power line 54. The motors MG1 and MG2 are driven by rotation through the switching of multiple switching elements of the inverters 41 and 42, controlled by a motor electronic control unit (hereinafter referred to as "motor ECU") 40.

The motor ECU 40 includes a microcomputer similar to the engine ECU 24. The motor ECU 40 inputs signals from various sensors via the input ports. For example, the motor ECU 40 inputs rotation positions θm1 and θm2 from rotation position sensors 43 and 44, which detect the rotational positions of the rotors of motors MG1 and MG2. The motor ECU 40 outputs various control signals via the output ports. For example, the motor ECU 40 outputs control signals to the inverters 41 and 42. The motor ECU 40 calculates electrical angles θe1 and θe2 and rotational speeds Nm1 and Nm2 of the motors MG1 and MG2 based on the rotation positions θm1 and θm2 of the rotors of the motors MG1 and MG2. The motor ECU 40 communicates with the HVECU 70.

The battery 50 is configured, for example, as a lithium-ion secondary battery or a nickel-metal hydride secondary battery. As described above, the battery 50 is connected to the inverters 41 and 42 via the power line 54. The battery 50 is managed by a battery electronic control unit (hereinafter referred to as "battery ECU") 52.

The battery ECU 52 includes a microcomputer similar to the engine ECU 24. The battery ECU 52 inputs signals from various sensors via the input ports. For example, the battery ECU 52 inputs a voltage Vb from a voltage sensor 51*v* attached between the terminals of the battery 50, and a current Ib from a current sensor 51*i* attached to the output terminal of the battery 50. The battery ECU 52 calculates the state of charge SOC of the battery 50 based on the integrated value of the current Ib of the battery 50. The battery ECU 52 communicates with the HVECU 70.

The connector 55 is configured to be connectable to a connector 101 of a relay device 100. The relay device 100 includes the connector 101 and a socket 103 that is connected to the connector 101 via a power line 102. The socket 103 allows for connecting an external device that is not components of the vehicle. An example of the external device includes an electrical appliance or a mobile device.

The external power supply device 58 is connected to the inverters 41 and 42 and the battery 50 via the power line 54, and is also connected to the connector 55 via a different power line 57. The external power supply device 58 converts the direct current from the power line 54 into alternating current of a predetermined voltage and supplies it to the connector 55 side. Specifically, the external power supply device 58 supplies the alternating current of the predetermined voltage to the external device connected to the connector 55 via the relay device 100. Hereinafter, supplying power from the vehicle to the outside of the vehicle (to the external device) is referred to as "external power supply."

The navigation device 60 includes a main unit 61 with a built-in control unit, a GPS antenna 62, and a display 63. The control unit of the main unit 61 includes a microcomputer, a storage medium (e.g., hard disk or SSD), input/output ports, and communication ports. The storage medium stores map information and other data. The map information includes service information (e.g., tourist information and parking areas), as well as road information for each travel segment (e.g., between traffic signals and intersections). The road information includes distance information, width information, lane count information, area information (urban or suburban), type information (general road or highway), slope information, legal speed limits, and the number of traffic signals and the like. The GPS antenna 62 receives information about the vehicle's current location. The display 63 is configured as a touch panel type display, and displays various information such as the map information, the vehicle's current location, and the planned route from the vehicle's current location to the destination, as well as allowing the user to input various commands. When the user sets the destination by operating the display 63, the main unit 61 of the navigation device 60 sets the planned route from the vehicle's current location to the destination based on the map information and the current position of the vehicle and the destination, and displays the set planned route on the display 63 for navigation guidance. The navigation device 60 communicates with the HVECU 70.

The HVECU 70 includes a microcomputer similar to the engine ECU 24. The HVECU 70 inputs signals from various sensors via input ports. For example, the HVECU 70 inputs a fuel amount Qf from a fuel sensor 25*a* attached to the fuel tank 25. The HVECU 70 also inputs a signal from the power switch 80, a shift position SP from a shift position sensor 82 that detects the operation position of the shift lever 81, an accelerator opening Acc from an accelerator pedal position sensor 84 that detects the depression amount of the accelerator pedal 83, a brake pedal position BP from a brake pedal position sensor 86 that detects the depression amount of the brake pedal 85, and a vehicle speed V from a vehicle speed sensor 87. The HVECU 70 inputs images taken inside the vehicle from an in-vehicle camera 88, images taken outside the vehicle (around the vehicle) from an external camera 89, and a signal from a power supply mode setting section 90 for setting the external power supply mode by the user. The HVECU 70 outputs various control signals via output ports. For example, the HVECU 70 outputs control signals to the external power supply device 58 and to a display section 92 mounted on the instrument panel. As described above, the HVECU 70 communicates with the engine ECU 24, motor ECU 40, battery ECU 52, and navigation device 60.

In the hybrid electric vehicle 20 according to the embodiment, the shift position SP includes positions such as the parking position (P position), reverse position (R position), neutral position (N position), and drive position (D position). When the shift position SP is in the P position, the drive wheels 39*a* and 39*b* are locked by the parking lock mechanism.

The hybrid electric vehicle 20 according to the embodiment configured as described above switches between hybrid driving that involves the operation of the engine 22 and electric driving that involves stopping of the operation of engine 22, through coordinated control of the HVECU 70, engine ECU 24, and motor ECU 40.

Figure 2:
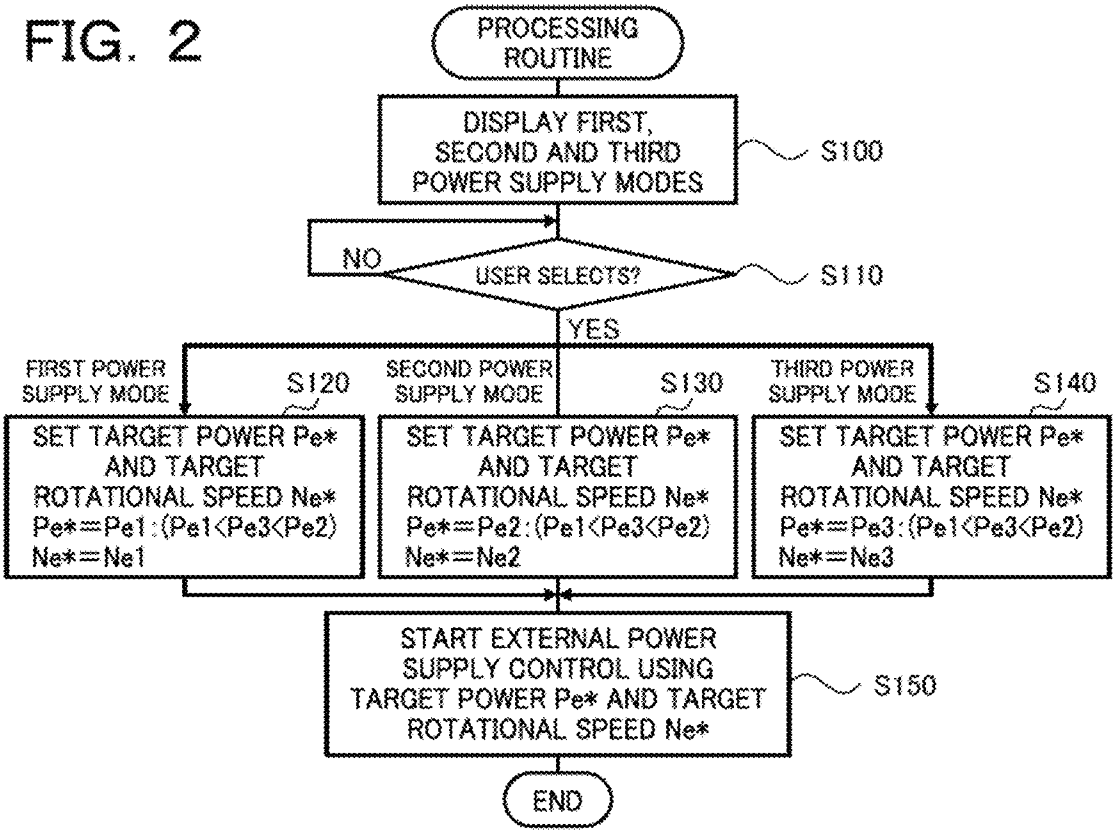
FIG. 2 is a flowchart illustrating an example of a processing routine.

Next, the operation of the hybrid electric vehicle 20 according to the embodiment will be described. In particular, the operation of the vehicle when the user desires the external power supply while the vehicle is parked, such as in emergencies or during leisure time, will be described. FIG. 2 is a flowchart illustrating an example of a processing routine executed by the HVECU 70. This routine is executed when the user desires the external power supply while the vehicle is parked. In the embodiment, when the vehicle is in a system stop state and the user presses the power switch 80 twice without depressing the brake pedal 85, the HVECU 70 determines that the user desires the external power supply and executes the processing routine shown in FIG. 2.

In the processing routine shown in FIG. 2, the HVECU 70 first displays first, second, and third power supply modes on the display section 92 (step S100). Here, the first, second, and third power supply modes are all a predetermined power supply mode for stopping the engine 22 and motor MG1 when the state of charge SOC of the battery 50 is greater than or equal to a threshold Sref, and for operating the engine 22 and generating power with the motor MG1 when the state of charge SOC of the battery 50 is less than the threshold Sref. In this predetermined power supply mode, the external power supply is carried out using only the power from the battery 50 when the state of charge SOC of the battery 50 is greater than or equal to the threshold Sref, and the external power supply is carried out using the power generated by the motor MG1 (and the power from the battery 50) when the state of charge SOC of the battery 50 is less than the threshold Sref. The first power supply mode is a noise suppression priority mode that prioritizes noise suppression, the second power supply mode is a power supply performance priority mode that prioritizes power supply performance, and the third power supply mode is a fuel efficiency priority mode that prioritizes fuel efficiency. In the embodiment, in the process of step S100, the HVECU 70 displays multiple power supply modes on the display section 92 such that the user is capable of recognizing the differences between each power supply mode, such as "noise suppression priority mode", "power supply performance priority mode", and "fuel efficiency priority mode".

Next, the HVECU70 waits for the user to select one of the first, second, or third power supply modes (step S110). Since the first, second, and third power supply modes are displayed on the display section 92, the user only needs to select one of the first, second, or third power supply modes by operating the power supply mode setting section 90. Thus, the user is able to set the power supply mode more easily.

When the user selects one of the first, second, or third power supply modes, the HVECU70 sets the target power Pe* and target rotational speed Ne* of the engine 22 based on the power supply mode selected by the user (steps S120 to S140), starts external power supply control using the set target power Pe* and target rotational speed Ne* (step $150), and then ends the processing routine.

Next, the setting process for the target power Pe* and target rotational speed Ne* of the engine 22 (steps $120 to S140) and the external power supply control (step S150) will be described in order. When the power supply mode selected by the user is the first power supply mode (noise suppression priority mode), the HVECU 70 sets the target power Pe* to a predetermined power Pe1 and sets the target rotational speed Ne* to a predetermined rotational speed Ne1 (step S120). When the power supply mode selected by the user is the second power supply mode (power supply performance priority mode), the HVECU 70 sets the target power Pe* to a predetermined power Pe2 and sets the target rotational speed Ne* to a predetermined rotational speed Ne2 (step S130). When the power supply mode selected by the user is the third power supply mode (fuel efficiency priority mode), the HVECU 70 sets the target power Pe* to a predetermined power Pe3 and sets the target rotational speed Ne* to a predetermined rotational speed Ne3 (step S140).

Figure 3:
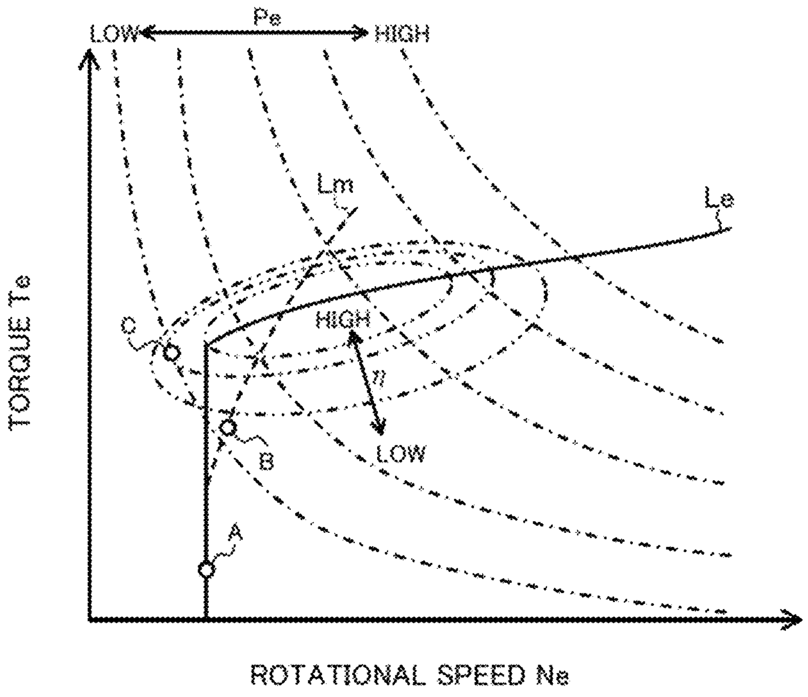
FIG. 3 is an explanatory diagram illustrating an example of target operating points for first, second, and third power supply modes.

FIG. 3 is an explanatory diagram illustrating an example of target operating points A, B, and C for the first, second, and third power supply modes. The target operating points A, B, and C are defined by the target rotational speed Ne* and target power Pe*, or by the target rotational speed Ne* and target torque Te* calculated by dividing the target power Pe* by the target rotational speed Ne*. FIG. 3 also shows an example of the operating line Le (see solid line), the boundary line Lm of the muffled sound area (see broken line), the constant power line (see single dotted line), and the constant efficiency line (see double dotted line). The operating line Le is a line for efficiently operating the engine 22 during the hybrid driving. The boundary line Lm of the muffled sound area is a boundary line on the high rotational speed and low torque side of the muffled sound area. The constant power line is a line where the power Pe of the engine 22 is constant. The constant efficiency line is a line where the efficiency of the engine 22 is constant.

As shown in FIG. 3, the predetermined power Pe1 is set as a relatively low power. In the embodiment, the predetermined power Pe1 is defined as a power that is lower than any of the powers at the multiple intersection points between the operating line Le and the boundary line Lm of the muffled sound area, in order to suppress the muffled sound considered as noise. The predetermined rotational speed Ne1 is defined as the rotational speed at the intersection point between the constant power line of the predetermined power Pe1 (not shown) and the operating line Le.

The predetermined power Pe2 is defined as a power that is greater than the predetermined powers Pe1 and Pe3. The predetermined rotational speed Ne2 is defined as the rotational speed that avoids the muffled sound area from the operating line Le. In the embodiment, the predetermined rotational speed Ne2 is defined as the rotational speed at the intersection point between the constant power line of the predetermined power Pe2 (not shown) and the boundary line Lm of the muffled sound area.

The predetermined power Pe3 is defined as a power that is greater than the predetermined power Pe1 and lower than the predetermined power Pe2. The predetermined rotational speed Ne3 is defined as the rotational speed at which the engine 22 is capable of operating efficiently compared to the first and second power supply modes. In the embodiment, the predetermined rotational speed Ne3 is defined as the rotational speed at which the efficiency n is maximized on the constant power line of the predetermined power Pe3 (not shown).

Next, the external power supply control will be described. The HVECU 70 performs the external power supply control when the connector 101 of the relay device 100 is connected to the connector 55 of the hybrid electric vehicle 20 and an external device is connected to the outlet 103 of the relay device 100. As described above, the first, second, and third power supply modes are all the predetermined power supply mode for stopping the engine 22 and motor MG1 when the state of charge SOC of the battery 50 is greater than or equal to a threshold Sref, and for operating the engine 22 and generating power with the motor MG1 when the state of charge SOC of the battery 50 is less than the threshold Sref. Therefore, in the external power supply control, the HVECU 70 controls the external power supply device 58 such that power is supplied from the power line 54 side to the connector 55 side regardless of the state of charge SOC of the battery 50. Additionally, in the external power supply control, through the coordinated control of the HVECU 70, engine ECU 24, and motor ECU 40, when the state of charge SOC of the battery 50 is greater than or equal to the threshold Sref, both the engine 22 and motor MG1 are stopped, when the state of charge SOC of the battery 50 is less than the threshold Sref, the engine 22 and inverter 41 are controlled to operate the engine 22 based on the target power Pe* and target rotation speed Ne*, and to generate power with the motor MG1 using the power from engine 22. With this control, during the external power supply, when the state of charge SOC of battery 50 is greater than or equal to the threshold Sref, the SOC of battery 50 decreases, when the state of charge SOC of battery 50 is less than the threshold Sref, the state of charge SOC of the battery 50 increases or decreases based on the relationship between the power generation of the motor MG1 in the selected power supply mode by the user and the power consumption of the external device. The HVECU 70 terminates the external power supply control when the connection between the outlet 103 of the relay device 100 and the external device is disconnected, when the connection between the connector 55 of the hybrid electric vehicle 20 and the connector 101 of the relay device 100 is disconnected, or in similar situations.

As described above, when the user desires the external power supply, the hybrid electric vehicle 20 according to the embodiment displays the first, second, and third power supply modes on the display 92, and when the user selects one of the first, second, or third power supply modes, the hybrid electric vehicle 20 performs the external power supply in the power supply mode selected by the user. Therefore, as the user only needs to select one of the first, second, or third power supply modes, the user is able to set the power supply mode more easily.

In the embodiment described above, the predetermined power supply mode is a power supply mode for stopping the engine 22 and motor MG1 when the state of charge SOC of the battery 50 is greater than or equal to a threshold Sref, and for operating the engine 22 and generating power with the motor MG1 when the state of charge SOC of the battery 50 is less than the threshold Sref. However, this is not limiting. For example, the predetermined power supply mode may be a power supply mode for operating the engine 22 and generating power with the motor MG1 regardless of the state of charge SOC of the battery 50.

In the embodiment described above, the multiple power supply modes include the first, second, and third power supply modes as the predetermined power supply mode. However, this is not limiting. For example, the multiple power supply modes may not include any one of the first, second, or third power supply modes as the predetermined power supply mode. Additionally, the multiple power supply modes may further include a second predetermined power supply mode in addition to the predetermined power supply mode. The second predetermined power supply mode is a power supply mode for stopping the engine 22 and motor MG1 regardless of the state of charge SOC of battery 50.

In the embodiment described above, the HVECU 70 sets the target power Pe* and target rotational speed Ne* of the engine 22 based on the power supply mode selected by the user from among the first, second, or third power supply modes. However, this is not limiting. For example, the HVECU 70 may set the target rotational speed Ne* and target torque Te* based on the power supply mode selected by the user. In addition, the HVECU 70 may set only the target power Pe* of the engine 22 when the power supply mode selected by the user is the first or second power supply mode. In this case, the engine 22 is capable of operating at any rotational speed Ne.

In the embodiment described above, the HVECU 70 displays the first, second, and third power supply modes on the display section 92, and the user selects one of the first, second, or third power supply modes by operating the power supply mode setting section 90. For example, the main unit 61 of the navigation device 60 may display the first, second, and third power supply modes on the display 63, and the user may select one of the first, second, or third power supply modes by operating the display 63.

In the embodiment described above, the HVECU 70 displays the first, second, and third power supply modes on the display section 92. However, this is not limiting. For example, in addition to displaying the first, second, and third power supply modes on the display section 92, the HVECU 70 may also notify the user of these modes audibly.

In the embodiment described above, the HVECU 70 executes the processing routine shown in FIG. 2. However, this is not limiting. For example, the HVECU 70 may execute a processing routine shown in FIG. 4. The processing routine shown in FIG. 4 differs from that shown in FIG. 2 in that the processes of the steps S100 and S110 are replaced with the processes of steps S200 to S260. Therefore, for the processes shown in FIG. 4 that are the same as those shown in FIG. 2, the same step numbers are assigned, and detailed descriptions are omitted.

Figure 4:
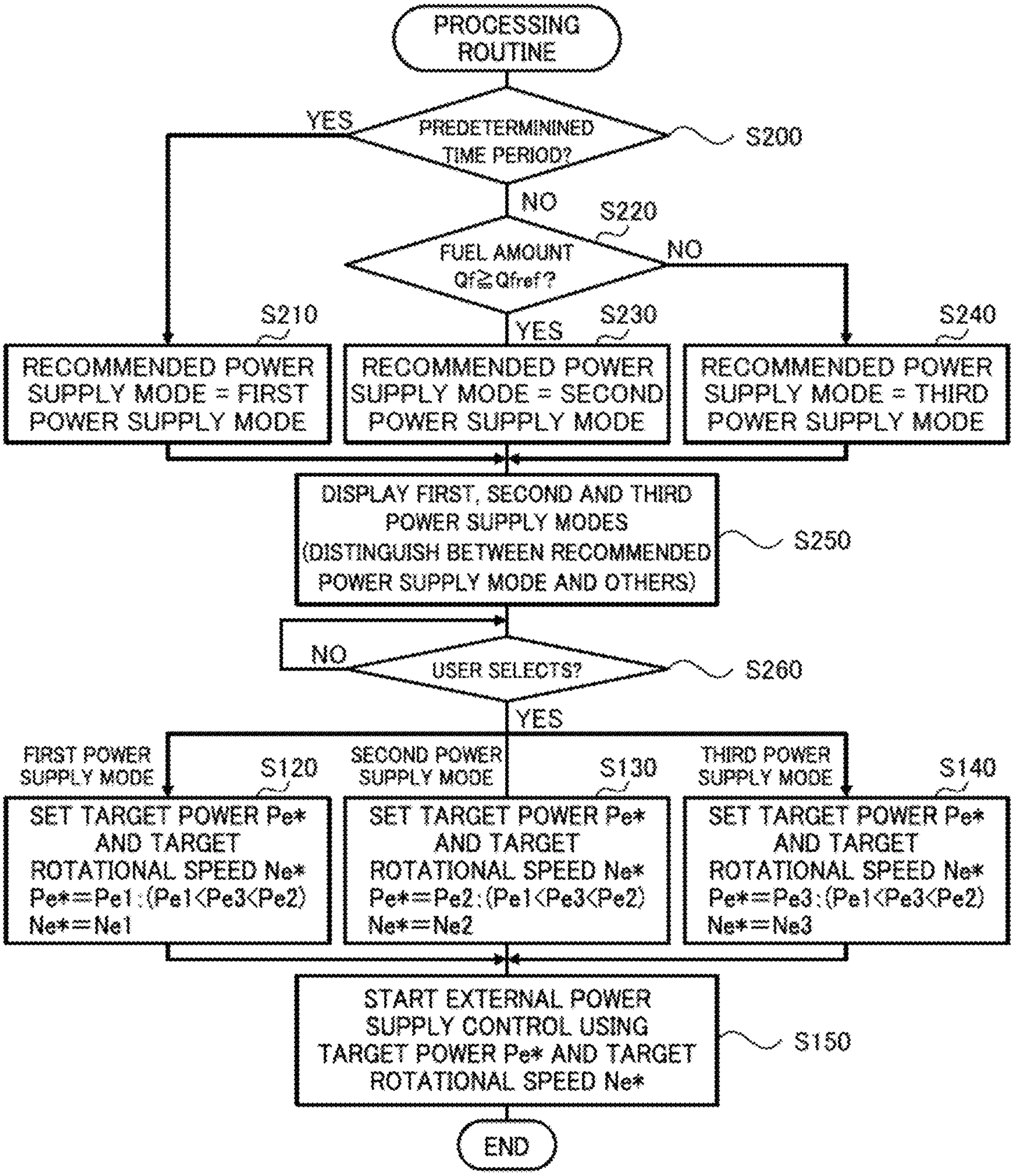
FIG. 4 is a flowchart illustrating an example of a processing routine according to a modification.

In the processing routine shown in FIG. 4, the HVECU 70 determines whether the current time is within predetermined time period (step S200). Here, the predetermined time period is defined as a time period during which noise suppression is required, for example, the nighttime period. When the HVECU 70 determines that the current time is within the predetermined time period, it sets a recommended power supply mode to the first power supply mode (noise suppression priority mode) (step S210).

When the HVECU 70 determines that the current time is not within the predetermined time period, it determines whether the fuel amount Qf in the fuel tank 25 is greater than or equal to a threshold Qfref (step S220). Here, the threshold Qfref is used to determine whether there is a certain amount of fuel remaining in the fuel tank 25. When the HVECU70 determines that the fuel amount Qf in the fuel tank 25 is greater than or equal to the threshold Qfref, it sets the recommended power supply mode to the second power supply mode (power supply performance priority mode) (step S230). On the other hand, when HVECU70 determines that the fuel amount Qf in the fuel tank 25 is less than the threshold Qfref, it sets the recommended power supply mode to the third power supply mode (fuel efficiency priority mode) (step S240). By performing the processes of steps S200 to S240, the recommended power supply mode is set more accurately based on whether the current time is within the predetermined time period and whether the fuel amount Qf in the fuel tank 25 is greater than or equal to the threshold Qfref.

When the recommended power supply mode is set in the steps S210 to S240, the HVECU70 displays the first, second, and third power supply modes on the display section 92 in a manner that differs between the recommended power supply mode and other power supply modes (step S250), the HVECU 70 waits for the user to select one of the first, second, or third power supply modes, in the same way as the above step S110 (step S260). In this case, the user only needs to select one of the first, second, or third power supply modes by operating the power supply mode setting section 90. Thus, the user is able to set the power supply mode more easily. In the step S250, for example, HVECU70 displays the recommended power supply mode in a larger font or bold font on the display section 92 to attract the user's attention. Therefore, the user is able to recognize the recommended power supply mode more easily, and is able to select the recommended power supply mode more easily. Then, when the user selects one of the first, second, or third power supply modes, the HVECU70 proceeds to one of the above steps S120 to S140 based on the power supply mode selected by the user.

Figure 5:
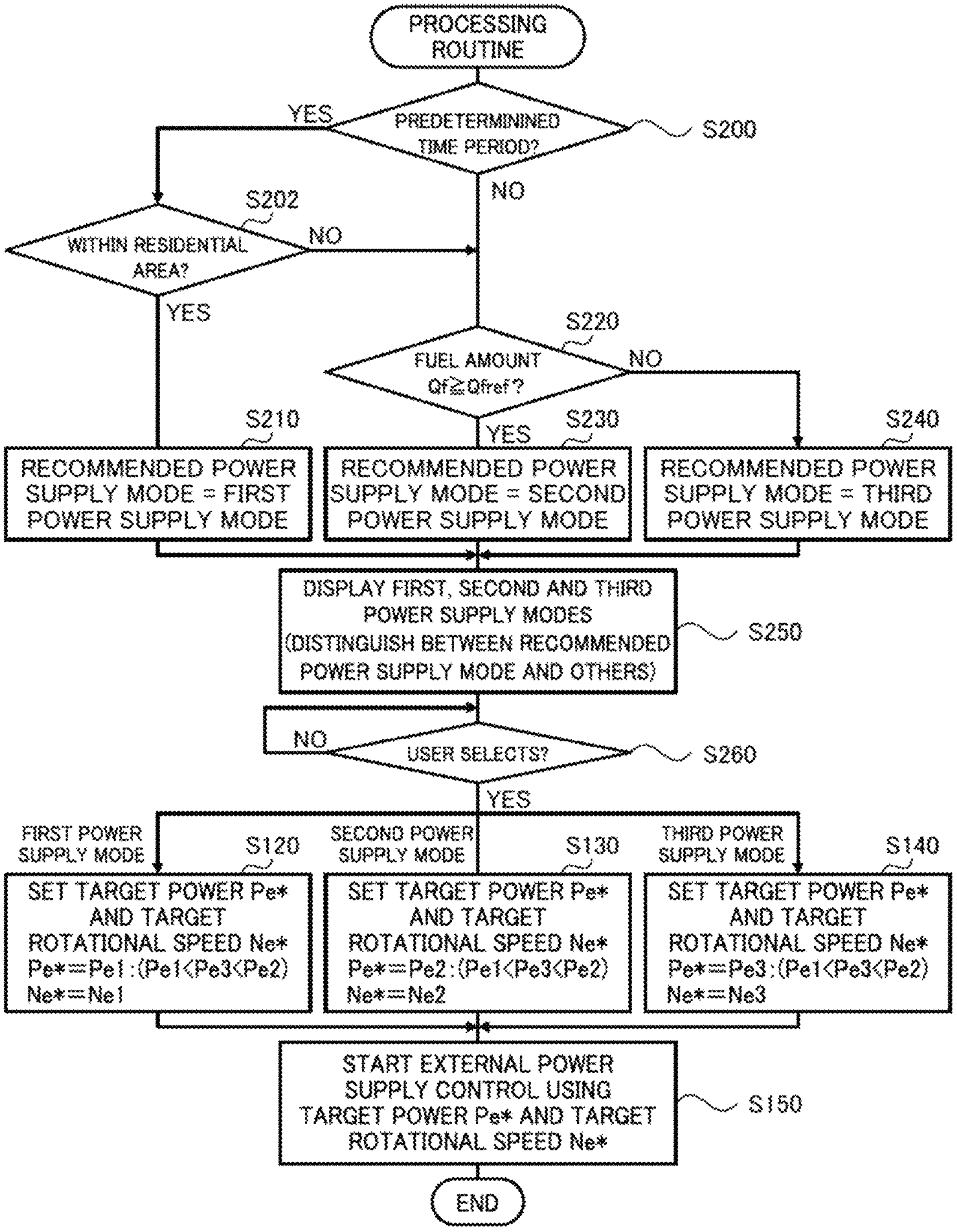
FIG. 5 is a flowchart illustrating an example of a processing routine according to another modification.

The HVECU 70 may execute the processing routine shown in FIG. 5 instead of the processing routine shown in FIG. 4. The processing routine shown in FIG. 5 differs from that shown in FIG. 4 in that the process of step S202 has been added. Therefore, for the processes shown in FIG. 5 that are the same as those shown in FIG. 4, the same step numbers are assigned, and detailed descriptions are omitted.

In the processing routine shown in FIG. 5, when the HVECU 70 determines in the step S200 that the current time is within the predetermined time period, it determines whether the vehicle's current location is within a residential area (Step S202). When the HVECU70 determines that the vehicle's current location is within the residential area, it sets the recommended power supply mode to the first power supply mode (noise suppression priority mode) (step S210). On the other hand, when the HVECU70 determines that the vehicle's current location is outside the residential area, it sets the recommended power supply mode to the second power supply mode (power supply performance priority mode) or the third power supply mode (fuel efficiency priority mode) based on the fuel amount Qf in the fuel tank 25 (steps S220 to S240). Therefore, the HVECU 70 is able to set the recommended power supply mode more accurately based on whether the vehicle's current location is within the residential area.

Figure 6:
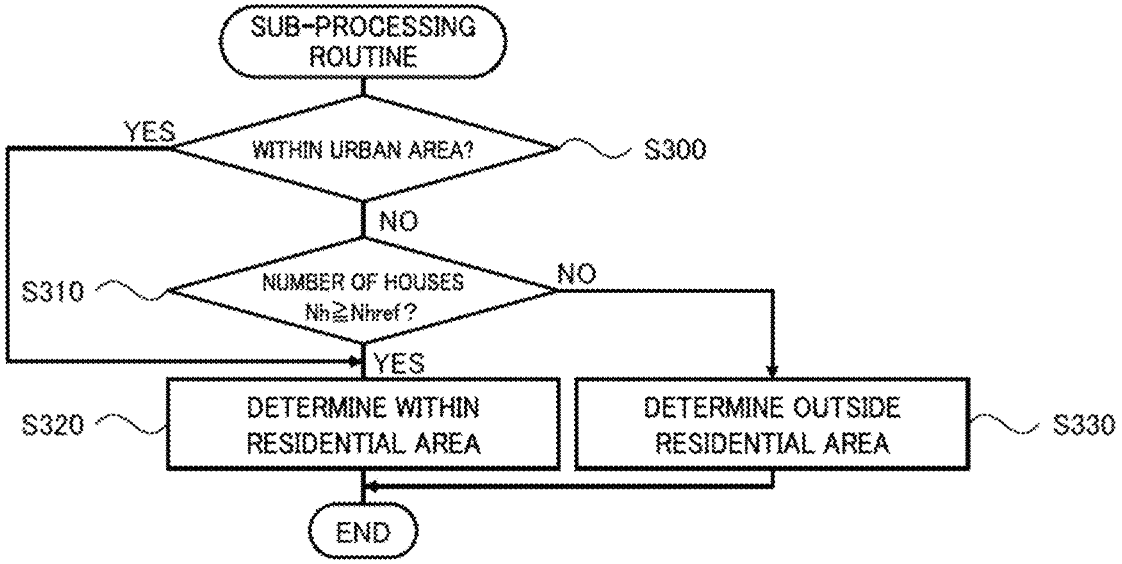
FIG. 6 is a flowchart illustrating an example of a subprocessing routine.

Here, the process for determining whether the vehicle's current location is within the residential area will be described. For example, the HVECU70 determines whether the vehicle's current location is within a residential area, for example, using a sub-processing routine shown in FIG. 6. In the sub-processing routine shown in FIG. 6, the HVECU 70 determines whether the vehicle's current location is within an urban area (step S300). This process is executed as follows, for example. The HVECU 70 transmits a determination instruction to the navigation device 60. The navigation device 60, which has received the determination instruction, determines whether the vehicle's current location is within the urban area using the vehicle's current location and map information, and transmits the determination result to the HVECU 70. The HVECU 70 receives the determination result. When the HVECU 70 determines that the vehicle's current location is within the urban area, it determines that the vehicle's current location is within the residential area (step S320) and ends the sub-processing routine.

When the HVECU 70 determines that the vehicle's current location is outside the urban area, it determines whether the number of houses Nh around the vehicle is greater than or equal to a threshold Nhref (step S310). Here, the number of houses Nh around the vehicle is the number of houses detected by image analysis of the images taken by the external camera 89. The threshold value Nhref is used to determine whether the vehicle's current location can be considered to be within the residential area. When the HVECU 70 determines that the number of houses Nh around the vehicle is greater than or equal to the threshold Nhref, it determines that the vehicle's current location is within the residential area (step S320) and ends the sub-processing routine. On the other hand, when the HVECU 70 determines that the number of houses Nh around the vehicle is less than the threshold Nhref, the HVECU 70 determines that the vehicle's current location is outside the residential area (step S330) and ends the sub-processing routine. By executing the sub-processing routine, the HVECU 70 is able to determine more accurately whether the vehicle's current location is within the urban area and whether the number of houses Nh around the vehicle is greater than or equal to the threshold Nhref.

In the processing routines shown in FIGS. 4 and 5, the HVECU 70 displays the first, second, and third power supply modes on the display section 92 in a manner that differs between the recommended power supply mode and other power supply modes. However, the HVECU 70 may display only the recommended power supply mode among the first, second, and third power supply modes on the display 92. In this case, when the user allows the recommended power supply mode, the HVECU 70 may proceed to one of the above steps S120 to S140 based on the recommended power supply mode. In addition, when the user does not allow the recommended power supply mode, the HVECU 70 may proceed to one of the above steps S120 to S140 based on the power supply mode used for the previous external power supply or based on the initial power supply mode. The initial power supply mode is, for example, the third power supply mode (fuel efficiency priority power supply mode).

Figure 7:
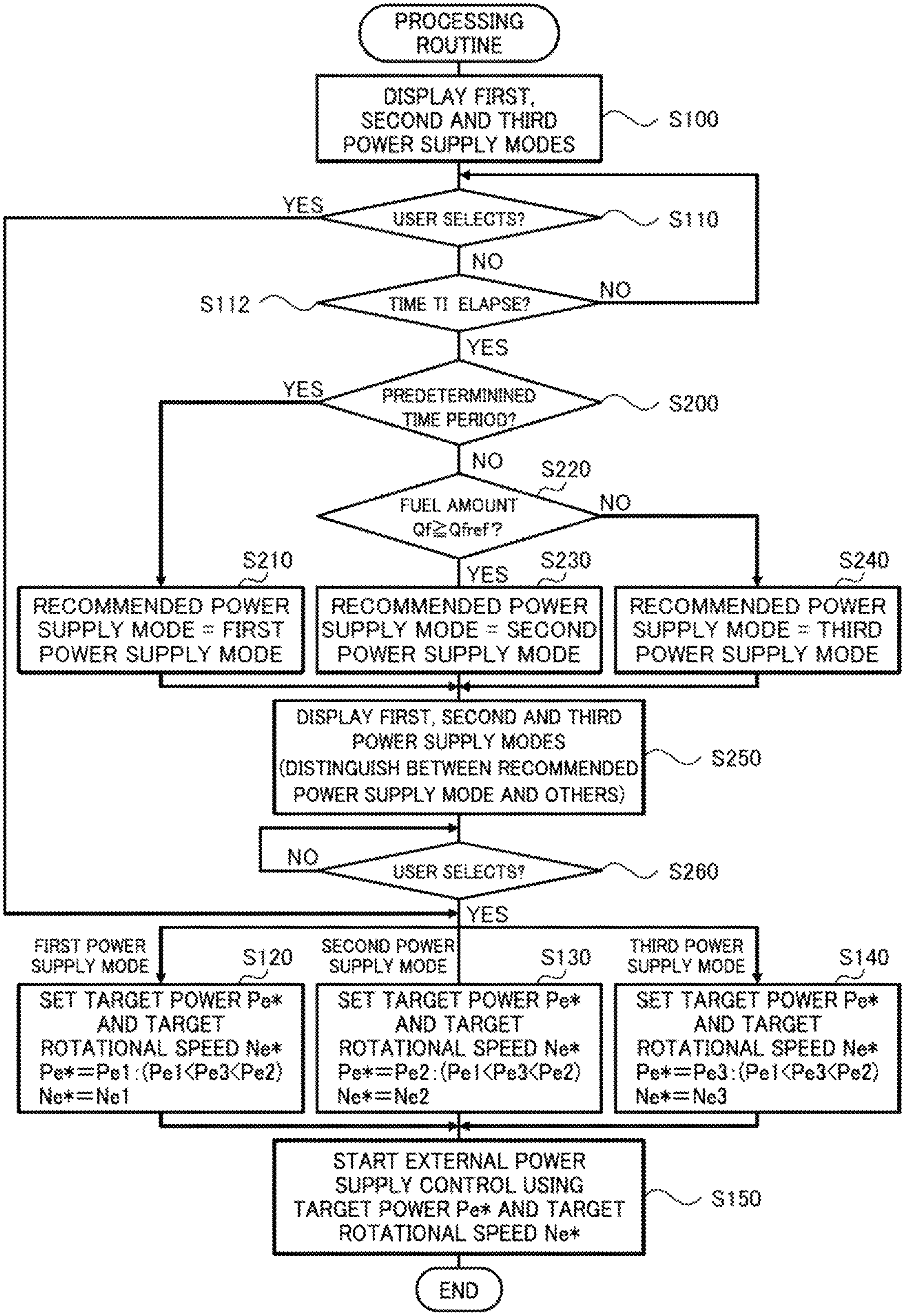
FIG. 7 is a flowchart illustrating an example of a processing routine according to yet another modification.

The HVECU 70 may execute the processing routine shown in FIG. 7 instead of the processing routines shown in FIGS. 2, 4, and 5. The processing routine shown in FIG. 7 includes, before the process of step S200 in the processing routine shown in FIG. 4, the processes of steps S100 and $110 from the processing routine shown in FIG. 2, as well as a new step S112.

In the processing routine shown in FIG. 7, the HVECU 70 displays the first, second, and third power supply modes on the display section 92 in the process of step S100, and when the HVECU 70 determines in the process of step S110 that the user has selected one of the first, second, and third power supply modes, it proceeds to one of the steps S120 to S140 based on the power supply mode selected by the user.

When the HVECU 70 determines in the step S110 that the user has not selected any of the first, second, or third power supply modes, it determines whether a predetermined time T1 has elapsed since the start of displaying the first, second, and third power supply modes on the display section 92 (step S112). The HVECU 70 returns to step S110 when HVECU 70 determines that the predetermined time T1 has not elapsed since the start of displaying the first, second, and third power supply modes on the display section 92. On the other hand, the HVECU 70 proceeds to the step S200 when HVECU 70 determines that the predetermined time T1 has elapsed since the start of displaying the first, second, and third power supply modes on the display section 92. In other words, when the user does not select any of the first, second or third power supply modes within the predetermined time T1 after the start of displaying the first, second, and third power supply modes on the display section 92, the HVECU 70 may set the recommended power supply mode, and display on the display section 92 in a manner that differs between the recommended power supply mode and other power supply modes.

Additionally, the processing routine shown in FIG. 7 may include the process of step S202 from the processing routine shown in FIG. 5.

Figure 8:
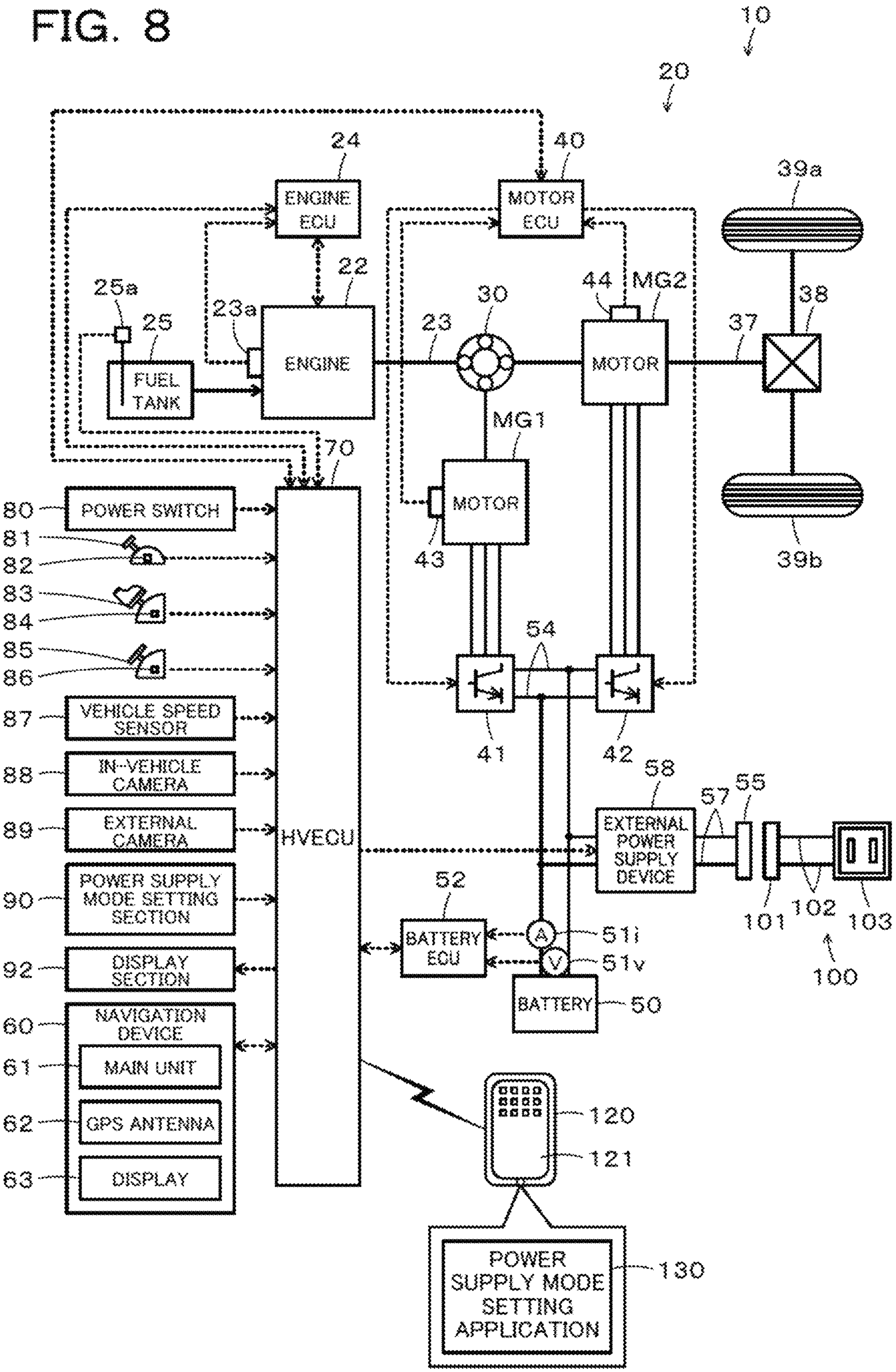
FIG. 8 is a schematic configuration diagram of an external power supply system according to a modification.

In the embodiment described above, the hybrid electric vehicle 20 displays the first, second, and third power supply modes on the display section 92 or display 63, and the user selects one of the first, second, and third power supply modes by operating the power supply mode setting section 90 or display 93. In this case, the hybrid electric vehicle 20 (HVECU 70) can be considered to correspond to the "power supply mode setting system" according to the present disclosure. However, this is not limiting. FIG. 8 is a schematic configuration diagram of an external power supply system 10 according to a modification. As shown in the illustration, the external power supply system 10 includes the hybrid electric vehicle 20 that is the same as the one shown in FIG. 1 and a mobile terminal 120. The mobile terminal 120 is configured as a smartphone or tablet terminal, and includes a computer, display 121, and communication device. The display 121 is configured as a touch panel type display. The mobile terminal 120 is installed with the power supply mode setting application 130, which is an application software for setting the power supply mode of external power supply. The mobile terminal 120 communicates with the hybrid electric vehicle 20 via the Internet, telephone lines, or other communication networks through the process of the power supply mode setting application 130.

In the external power supply system 10, when the user desires the external power supply, the following processes may be performed instead of the processes of steps S100 and S110 in the processing routine shown in FIG. 2. The mobile device 120 displays the first, second, and third power supply modes on the display 121 by processing the power supply mode setting application 130. Next, when the user selects one of the first, second, or third power supply modes by operating the display 121, the mobile terminal 120 transmits the power supply mode selected by the user to the HVECU 70, and the HVEECU 70, which has received this, proceeds to any of the steps S120 to S140 based on the power supply mode selected by the user. In other words, the mobile terminal 120 may display the first, second and third power supply modes on the display 121, and the user may select one of the first, second and third power supply modes by operating the display 121. In this case, the mobile terminal 120 (power supply mode setting application 130) can be considered to correspond to the "power supply mode setting system" according to the present disclosure.

The processes of steps S100 and S110 in the processing routine shown in FIG. 2 have been replaced from the processing of the hybrid electric vehicle 20 to the processing of the mobile terminal 120, but at least some of the processes of steps S200 to S 260 shown in FIG. 4 or 5, or at least some of the processes of steps S100 to S260 in FIG. 7, etc., may also be similarly replaced from the processing of the hybrid electric vehicle 20 to the processing of the mobile terminal 120.

In the embodiment described above, the external power supply is defined as supplying power from the hybrid electric vehicle 20 to the external device. However, this is not limiting. For example, the external power supply may be defined as supplying power from the hybrid electric vehicle 20 to a house or similar structures.

In the embodiment described above, the hybrid electric vehicle 20 uses the battery 50 as the power storage device. However, this is not limiting. For example, the hybrid electric vehicle 20 may also use a capacitor as the power storage device.

In the embodiment described above, the hybrid electric vehicle 20 includes the engine ECU 24, the motor ECU 40, the battery ECU 52, and the HVECU 70. However, this is not limiting. For example, the hybrid electric vehicle 20 may include at least two of the engine ECU 24, motor ECU 40, battery ECU 52, and HVECU 70 integrated into a single unit.

Figure 9:
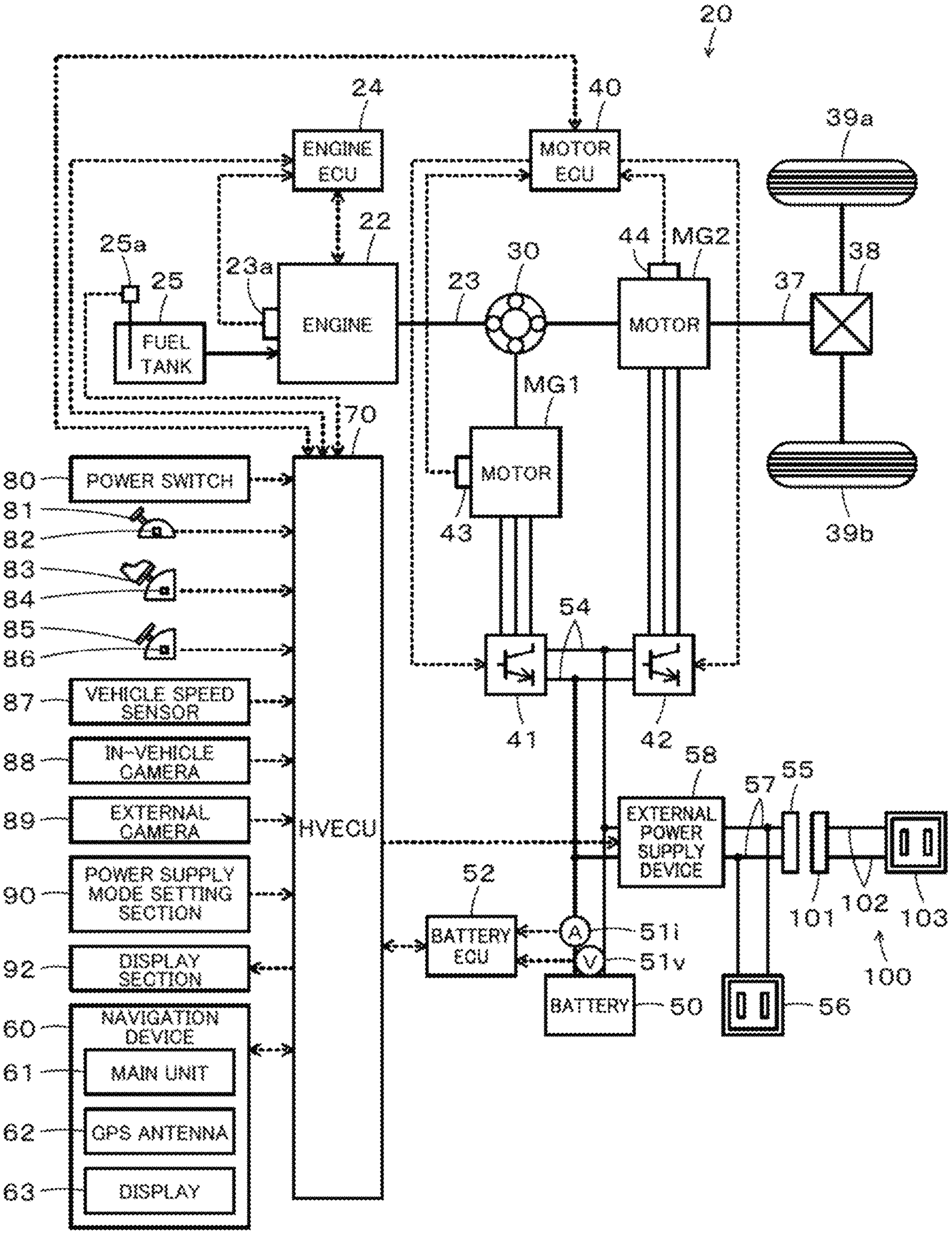
FIG. 9 is a schematic configuration diagram of a hybrid electric vehicle according to another modification.

In the hybrid electric vehicle 20 according to the embodiment described above, the connector 55 is connected to the external power supply device 58 via the power line 57. However, this is not limiting. For example, as shown in the hybrid electric vehicle 20B according to another modification in FIG. 9, the connector 55 and outlet 56 may be connected to the external power supply device 58 via the power line 57. The hybrid electric vehicle 20B may not necessarily include the connector 55.

Figure 10:
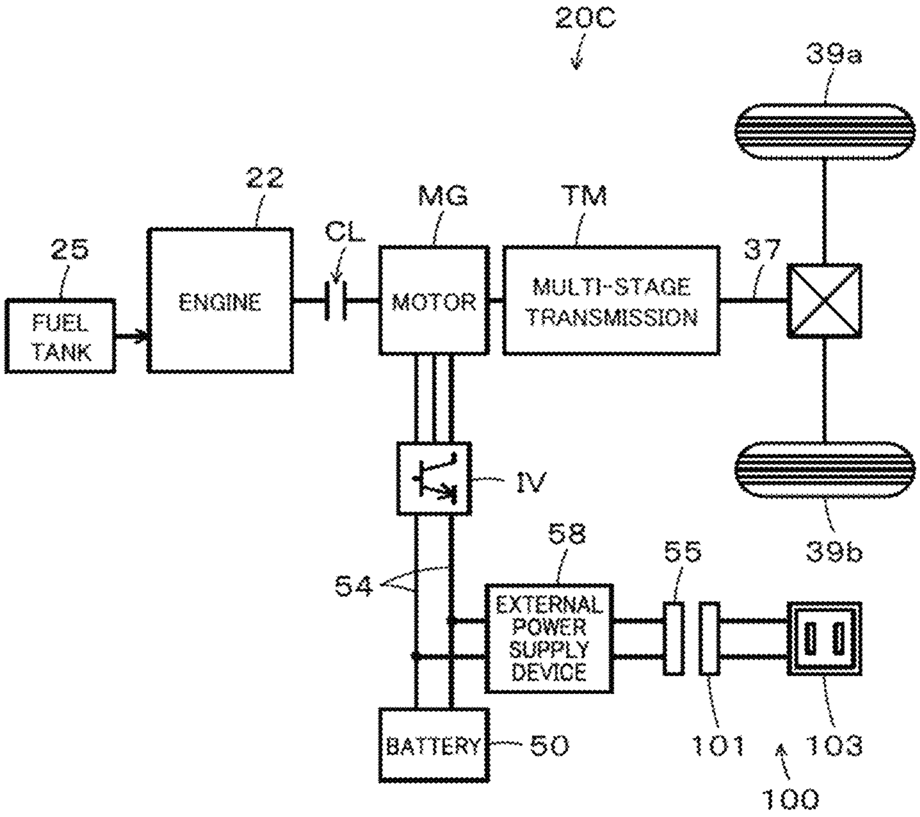
FIG. 10 is a schematic configuration diagram of a hybrid electric vehicle according to yet another modification.

In the embodiment described above, the hybrid electric vehicle 20 includes the engine 22, planetary gear 30, motors MG1 and MG2, inverters 41 and 42, battery 50, and external power supply device 58. However, this is not limiting. For example, as shown in the hybrid electric vehicle 20C according to yet another modification in FIG. 10, the hybrid electric vehicle 20C may include an engine 22, a clutch CL, a motor MG, an inverter IV, a battery 50, a multi-stage transmission TM, and an external power supply device 58. In the hybrid electric vehicle 20C, the engine 22 is connected to the drive wheels 39*a* and 39*b* via the clutch CL, the motor MG, the multi-stage transmission TM, and a drive shaft 37. The inverter INV that drives the motor MG, the battery 50, and the external power supply device 58 are connected to a power line 54.

In the embodiment described above, the form of the hybrid electric vehicle 20, and the form of the external power supply system 10, which includes the hybrid electric vehicle 20 and the mobile terminal 120 (power supply mode setting application 130), were described. However, this is not limiting. For example, it may take the form of a control method for the hybrid electric vehicle 20 or a power supply mode setting method.

[1] A hybrid electric vehicle according to the present disclosure is a hybrid electric vehicle comprising: an engine configured to output power using fuel from a fuel tank; a generator configured to generate power using the power from the engine; a power storage device connected to a power line together with the generator; and a controller. When a user desires external power supply, in which power is supplied from the vehicle to outside of the vehicle, the controller is programmed to present the user with multiple power supply modes that have different power supply characteristics, and when the user selects one of the multiple power supply modes, the controller is programmed to perform the external power supply in the power supply mode selected by the user.

In the hybrid electric vehicle according to the present disclosure, when the user desires the external power supply, in which the power is supplied from the vehicle to the outside of the vehicle, the controller presents the user with the multiple power supply modes that have the different power supply characteristics, and when the user selects one of the multiple power supply modes, the controller performs the external power supply in the power supply mode selected by the user. Therefore, as the user only needs to select one of the multiple power supply modes, the user is able to set the power supply mode more easily. Here, the "external power supply" may refer to supplying power from the vehicle to an external device or to supplying power from the vehicle to a house or similar structures. The "external device" is a device that is not components of the vehicle, and an example includes an electrical appliance or a mobile device.

[2] In the hybrid vehicle described above (as described in [1]), the multiple power supply modes may include, as a predetermined power supply mode for operating the engine and generating power with the generator, at least two of a first power supply mode that prioritizes noise suppression, a second power supply mode that prioritizes power supply performance, and a third power supply mode that prioritizes fuel efficiency.

[3] In the hybrid vehicle described above (as described in [2]), the predetermined power supply mode may be a mode for operating the engine and generating power with the generator when the state of charge of the power storage device is less than a predetermined ratio during the external power supply.

[4] In the hybrid vehicle described above (as described in any one of [1] to [3]), the controller may present the user with the multiple power supply modes, including a recommended power supply mode based on the current environment. In this way, the hybrid electric vehicle is capable of presenting the user with the recommended power supply mode based on the current environment.

[5] In the hybrid vehicle described above (as described in [4]), the controller may present the recommended power supply mode and other power supply modes to the user in a manner that differs from each other. In this way, the User is more likely to recognize the recommended power supply mode and select it.

[6] In the hybrid vehicle described above (as described in [4] or [5]), the multiple power supply modes may include, as a predetermined power supply mode for operating the engine and generating power with the generator when the state of charge of the power storage device is less than a predetermined ratio during the external power supply, a first power supply mode that prioritizes noise suppression, a second power supply mode that prioritizes power supply performance, and a third power supply mode that prioritizes fuel efficiency, the controller may set the recommended power supply mode to the first power supply mode when a current time is within a predetermined time period, the controller may set the recommended power supply mode to the second power supply mode when the current time is not within the predetermined time period and a fuel amount in the fuel tank is greater than or equal to a predetermined amount, and the controller may set the recommended power supply mode to the third power supply mode when the current time is not within the predetermined time period and the fuel amount is less than the predetermined amount. In this way, the hybrid electric vehicle is able to set the recommended power supply mode based on whether the current time is within the predetermined time period and whether the fuel amount in the fuel tank is greater than or equal to the predetermined amount.

[7] In the hybrid vehicle described above (as described in [6]), the controller may set the recommended power supply mode to the first power supply mode when the current time is within the predetermined time period and when a vehicle's current location is within a residential area, the controller may set the recommended power supply mode to the second or third power supply mode based on the fuel amount when the current time is within the predetermined time period and when the vehicle's current location is outside the residential area. In this way, the hybrid electric vehicle is able to set the recommended power supply mode based on whether the vehicle's current location is within a residential area.

[8] In the hybrid vehicle described above (as described in any one of [2], [6] or [7]), the first power supply mode may be a mode for operating the engine to output a first power, the second power supply mode may be a mode for operating the engine to output a second power greater than the first power, and the third power supply mode may be a mode for operating the engine at a more efficient operating point compared to the first and second power supply modes.

[9] A control method for a hybrid electric vehicle according to the present disclosure is a control method for a hybrid electric vehicle comprising: an engine configured to output power using fuel from a fuel tank; a generator configured to generate power using the power from the engine; and a power storage device connected to a power line together with the generator. When a user desires external power supply, in which power is supplied from the vehicle to outside of the vehicle, the control method is programmed to present the user with multiple power supply modes that have different power supply characteristics, and when the user selects one of the multiple power supply modes, the control method is programmed to perform the external power supply in the power supply mode selected by the user.

In the control method for a hybrid electric vehicle according to the present disclosure, when the user desires the external power supply, in which the power is supplied from the vehicle to the outside of the vehicle, the control method presents the user with the multiple power supply modes that have the different power supply characteristics, and when the user selects one of the multiple power supply modes, the control method performs the external power supply in the power supply mode selected by the user. Therefore, as the user only needs to select one of the multiple power supply modes, the user is able to set the power supply mode more easily.

A power supply mode setting system according to the present disclosure is a power supply mode setting system for a hybrid electric vehicle comprising: engine configured to output power using fuel from a fuel tank; a generator configured to generate power using the power from the engine; a power storage device connected to a power line together with the generator; and a controller, and the power supply mode setting system being used to set a power supply mode when a user desires external power supply, in which power is supplied from the vehicle to outside of the vehicle. The power supply mode setting system is programmed to present the user with multiple power supply modes that have different power supply characteristics, and when the user selects one of the multiple power supply modes, the power supply mode setting system is programmed to cause the vehicle to perform the external power supply in the power supply mode selected by the user.

In the power supply mode setting system according to the present disclosure, the power supply mode setting system presents the user with multiple power supply modes that have different power supply characteristics, and when the user selects one of the multiple power supply modes, the power supply mode setting system causes the vehicle to perform the external power supply in the power supply mode selected by the user. Therefore, as the user only needs to select one of the multiple power supply modes, the user is able to set the power supply mode more easily. Here, the "power supply mode setting system" may be a controller installed in the hybrid vehicle, or it may be a mobile device capable of communicating with the hybrid vehicle, such as a smartphone or tablet.

A power supply mode setting method is a power supply mode setting method for a hybrid electric vehicle comprising: an engine configured to output power using fuel from a fuel tank; a generator configured to generate power using the power from the engine; a power storage device connected to a power line together with the generator; and a controller, and the power supply mode setting method being used to set a power supply mode when a user desires external power supply, in which power is supplied from the vehicle to outside of the vehicle. The power supply mode setting method is programmed to present the user with multiple power supply modes that have different power supply characteristics, and when the user selects one of the multiple power supply modes, the power supply mode setting method is programmed to cause the vehicle to perform the external power supply in the power supply mode selected by the user.

In the power supply mode setting method according to the present disclosure, the power supply mode setting method presents the user with multiple power supply modes that have different power supply characteristics, and when the user selects one of the multiple power supply modes, the power supply mode setting method causes the vehicle to perform the external power supply in the power supply mode selected by the user. Therefore, as the user only needs to select one of the multiple power supply modes, the user is able to set the power supply mode more easily.

The correspondence relationship between the primary elements of the above embodiment and the primary elements of the disclosure described in Summary will be described. In the embodiment, the hybrid electric vehicle 20 corresponds to the "hybrid electric vehicle", the engine 22 corresponds to the "engine", the motor MG1 corresponds to the "generator", the battery 50 corresponds to the "power storage device", and the HVECU 70, engine ECU 24, and motor ECU 40 correspond to the "controller". The hybrid electric vehicle 20 (HVECU 70) and the mobile terminal 120 (power supply mode setting application 130) correspond to the "power supply mode setting system".

The correspondence relationship between the primary elements of the embodiment and the primary elements of the disclosure, regarding which the problem is described in Summary, should not be considered to limit the elements of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the present disclosure is applicable to the manufacturing industries of the hybrid electric vehicles and so on.

What is claimed is:

1. A hybrid electric vehicle comprising:
an engine configured to output power using fuel from a fuel tank;
a generator configured to generate power using a power from the engine;
a power storage device connected to a power line together with the generator; and
a controller, wherein
when a user desires external power supply, in which power is supplied from the vehicle to outside of the vehicle, the controller is programmed to present the user with multiple power supply modes that have different power supply characteristics, and
when the user selects one of the multiple power supply modes, the controller is programmed to set a target power and set a target rotational speed of the engine based on the power supply mode selected by the user, and start control of the external power supply using the set target power and the set target rotational speed in the power supply mode selected by the user.

2. The hybrid electric vehicle according to claim 1,
wherein the multiple power supply modes include, as a predetermined power supply mode for operating the engine and generating power with the generator, at least two of a first power supply mode that prioritizes noise suppression, a second power supply mode that prioritizes power supply performance, and a third power supply mode that prioritizes fuel efficiency.

3. The hybrid electric vehicle according to claim 2,
wherein the predetermined power supply mode is a mode for operating the engine and generating power with the generator when a state of charge of the power storage device is less than a predetermined ratio during the external power supply.

4. The hybrid electric vehicle according to claim 1,
wherein the controller presents the user with the multiple power supply modes, including a recommended power supply mode based on a current environment.

5. The hybrid electric vehicle according to claim 4,
wherein the controller presents the recommended power supply mode and other power supply modes to the user in a manner that differs from each other.

6. The hybrid electric vehicle according to claim 4,
wherein the multiple power supply modes include, as a predetermined power supply mode for operating the engine and generating power with the generator when a state of charge of the power storage device is less than a predetermined ratio during the external power supply, a first power supply mode that prioritizes noise suppression, a second power supply mode that prioritizes power supply performance, and a third power supply mode that prioritizes fuel efficiency,
the controller sets the recommended power supply mode to the first power supply mode when a current time is within a predetermined time period,
the controller sets the recommended power supply mode to the second power supply mode when the current time is not within the predetermined time period and a fuel amount in the fuel tank is greater than or equal to a predetermined amount, and
the controller sets the recommended power supply mode to the third power supply mode when the current time is not within the predetermined time period and the fuel amount is less than the predetermined amount.

7. The hybrid electric vehicle according to claim 6,
wherein the controller sets the recommended power supply mode to the first power supply mode when the current time is within the predetermined time period and when a vehicle's current location is within a residential area,
the controller sets the recommended power supply mode to the second or third power supply mode based on the fuel amount when the current time is within the predetermined time period and when the vehicle's current location is outside the residential area.

8. The hybrid electric vehicle according to claim 2,
wherein the first power supply mode is a mode for operating the engine to output a first power,
the second power supply mode is a mode for operating the engine to output a second power greater than the first power, and
the third power supply mode is a mode for operating the engine at a more efficient operating point compared to the first and second power supply modes.

9. The hybrid electric vehicle according to claim 7,
wherein the first power supply mode is a mode for operating the engine to output a first power,
the second power supply mode is a mode for operating the engine to output a second power greater than the first power, and
the third power supply mode is a mode for operating the engine at a more efficient operating point compared to the first and second power supply modes.

10. A control method for a hybrid electric vehicle comprising: an engine configured to output power using fuel from a fuel tank; a generator configured to generate power using the power from the engine; and a power storage device connected to a power line together with the generator, the control method comprising:
when a user desires external power supply, in which power is supplied from the vehicle to outside of the vehicle, presenting the user with multiple power supply modes that have different power supply characteristics, and
when the user selects one of the multiple power supply modes, setting a target power and setting a target rotational speed of the engine based on the power supply mode selected by the user, and starting control of the external power supply using the set target power and the set target rotational speed in the power supply mode selected by the user.

11. A power supply mode setting system for a hybrid electric vehicle comprising:

an engine configured to output power using fuel from a fuel tank;

a generator configured to generate power using the power from the engine;

a power storage device connected to a power line together with the generator; and a controller, and the power supply mode setting system being used to set a power supply mode when a user desires external power supply, in which power is supplied from the vehicle to outside of the vehicle, wherein the power supply mode setting system is programmed to present the user with multiple power supply modes that have different power supply characteristics, and when the user selects one of the multiple power supply modes, the power supply mode setting system is programmed to cause the vehicle to set a target power and set a target rotational speed of the engine based on the power supply mode selected by the user, and start control of the external power supply using the set target power and the set target rotational speed in the power supply mode selected by the user.

12. A power supply mode setting method for a hybrid electric vehicle comprising: an engine configured to output power using fuel from a fuel tank; a generator configured to generate power using the power from the engine; a power storage device connected to a power line together with the generator; and a controller, and the power supply mode setting method being used to set a power supply mode when a user desires external power supply, in which power is supplied from the vehicle to outside of the vehicle, the power supply mode setting method comprising:

presenting the user with multiple power supply modes that have different power supply characteristics, and when the user selects one of the multiple power supply modes, causing the vehicle to set a target power and set a target rotational speed of the engine based on the power supply mode selected by the user, and start control of the external power supply using the set target power and the set target rotational speed in the power supply mode selected by the user.

13. The hybrid electric vehicle according to claim 1, wherein the controller is programmed to set the target power to a predetermined power and set the target rotational speed to a predetermined rotational speed, the predetermined power being defined as a power that is lower than any power at multiple intersection points between an operating line and a boundary line of a muffled sound area.

14. The hybrid electric vehicle according to claim 13, wherein the predetermined rotational speed is defined as a rotational speed at an intersection point between a constant power line of the predetermined power and the operating line.

* * * * *